United States Patent [19]

Hata et al.

[11] 4,376,428
[45] Mar. 15, 1983

[54] SPARK TIMING CONTROL SYSTEM FOR INTERNAL COMBUSTION ENGINE

[75] Inventors: Yoshitaka Hata, Fujisawa; Giichi Shioyama, Yokosuka, both of Japan

[73] Assignee: Nissan Motor Company, Limited, Yokohama, Japan

[21] Appl. No.: 123,568

[22] Filed: Feb. 22, 1980

[30] Foreign Application Priority Data

Feb. 23, 1979 [JP] Japan .................................. 54-19842

[51] Int. Cl.³ .............................................. F02P 5/04
[52] U.S. Cl. .................................... 123/417; 123/609; 364/431.04
[58] Field of Search ................. 123/416, 417; 364/431

[56] References Cited

U.S. PATENT DOCUMENTS

| | | | |
|---|---|---|---|
| 3,927,648 | 12/1975 | Kawai et al. | 123/416 |
| 3,969,614 | 7/1976 | Moyer et al. | 123/417 X |
| 3,998,193 | 12/1976 | Ives et al. | 123/146.5 A X |
| 4,052,967 | 10/1977 | Colling et al. | 123/416 |
| 4,081,995 | 4/1978 | Griffith et al. | 123/416 X |
| 4,167,923 | 9/1979 | Iwase et al. | 123/416 |
| 4,174,688 | 11/1979 | Honig et al. | 123/416 |
| 4,196,705 | 4/1980 | Hattori et al. | 123/416 |
| 4,204,256 | 5/1980 | Klotzner | 123/417 X |
| 4,231,091 | 10/1980 | Motz | 123/417 X |
| 4,231,331 | 11/1980 | Suzuki et al. | 123/416 |
| 4,236,214 | 11/1980 | Sasayama | 123/417 X |
| 4,258,684 | 3/1981 | Schira | 123/416 |
| 4,276,601 | 6/1981 | Tokuda et al. | 123/417 X |
| 4,347,570 | 8/1982 | Akiyama et al. | 123/417 X |

FOREIGN PATENT DOCUMENTS

| | | | |
|---|---|---|---|
| 55-142965 | 11/1980 | Japan | 123/417 |
| 2012353 | 7/1979 | United Kingdom | |
| 2022295 | 12/1979 | United Kingdom | |

OTHER PUBLICATIONS

SAE paper No. 750433, "Engine Control by an On-Board Computer", by Moyer and Mangrulkar, Feb. 1975.

Primary Examiner—Tony M. Argenbright
Attorney, Agent, or Firm—Lowe, King, Price & Becker

[57] ABSTRACT

The occurrence times of discharges of a multi-cylinder internal combustion engine of an automotive vehicle having a transmission and sources for deriving signals indicative of: (a) the engine being cranked or operating normally, (b) the transmission being in high or low gear, (c) engine speed, and (d) the values of parameters determining engine load are controlled by a computer responsive to the signals. The computer includes a read only memory having tables for storing signals with values indicative of spark advance and dwell angle as functions of engine load and engine speed for the engine being cranked, operating normally, the transmission being in high and low gear. The computer responds to the signals of the sources for selecting from the tables stored signals having values indicative of spark advance and dwell angle corresponding with the conditions indicated by signals (a), (b), (c) and (d). A spark control circuit responds to the signals having values indicative of spark advance and dwell angle to control the occurrence times of sparking for each cylinder of the engine. The same type of computer is susceptible to use for vehicles having different spark advance and dwell angle characteristics as functions of engine speed and engine load. The tables are for plural vehicle types having the different characteristics. Switches selectively enable signals of the tables associated with only one of the vehicle types to be coupled to the computer.

14 Claims, 7 Drawing Figures

SPARK TIMING CONTROL SYSTEM FOR INTERNAL COMBUSTION ENGINE

BACKGROUND OF THE INVENTION

1. Field of the Invention

The present invention relates to a spark timing control system for use in an internal combustion engine and, more particularly, to such a spark timing control system using a microprocessor with first and second read only memory means for storing signals representing spark advance and dwell angle values as a function of engine operating conditions.

2. Description of the Prior Art

With recent miniaturized computer technologh advancement, electronic spark timing control systems have been developed which include a mini-computer responsive to signals indicative of various engine operating parameters, such as engine speed and load, to calculate the required spark advance. Such electronic spark timing control systems perform stable spark advance calculations with close tolerances. In addition, they consume less space and have control accuracy relatively unaffected by changes in environment conditions, as compared to conventional engine speed responsive centrifugal and vacuum manifold responsive vacuum advance devices.

However, which such conventional electronic spark timing control systems it is difficult to provide highly accurate spark timing control for engine operating parameters and impossible to determine an optimum spark advance for each pair of engine speed and load values if handling exhaust gas recirculation rate or other engine operating parameters are not given in an arithmetic expression. The reason for this is that the conventional minicomputer spark timing control systems are substantially similar in function to the conventional mechanical control device except that spark advance calculations are performed electrically rather than mechanically, i.e. the prior art minicomputer systems are basically electronic analogs of the mechanical systems.

SUMMARY OF THE INVENTION

It is therefore one object of the present invention to provide an improved electronic spark timing control system which is free from the above described disadvantages found in conventional designs.

Another object of the present invention is to provide an electronic spark timing control system of the character described which can provide an optimum spark advance value for various vehicle running conditions.

DESCRIPTION OF THE DRAWINGS

For a better understanding of the invention, as well as other objects and feature thereof, reference is made to the following detailed description of the invention to be read in connection with the accompanying drawings, in which.

DESCRIPTION OF THE PREFERRED EMBODIMENTS

Figure 1:
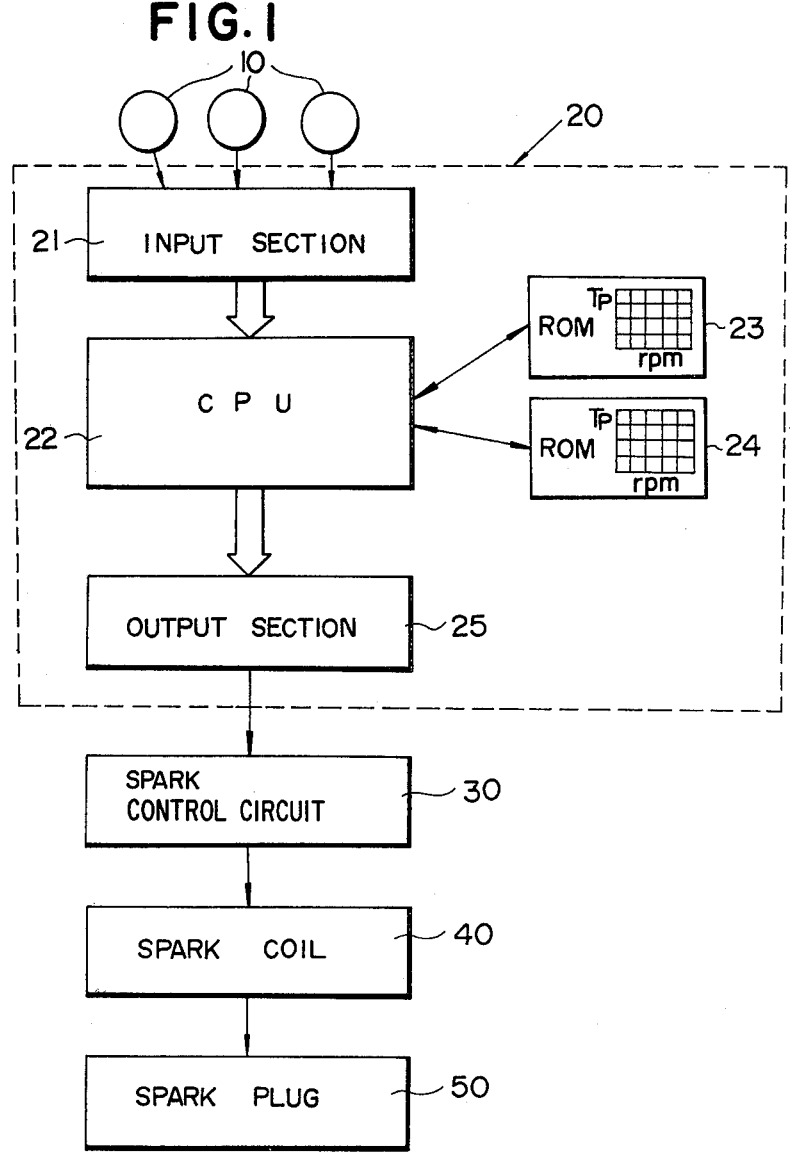
FIG. 1 is a block diagram of one embodiment of a spark timing control system in accordance with the present invention.

Referring now to FIG. 1, there is illustrated one preferred embodiment of a spark timing control system comprising monitoring means 10 for detecting various vehicle running parameters, and a microcomputer 20 for processing the information fed from the monitoring means 10 to determine an optimum spark advance and dwell angle at which sparks, i.e., discharges, are produced at each cylinder spark plug.

The monitoring means 10 may include an air flow sensor responsive to the air flow to produce an analog signal proportional thereto, a crank angle sensor responsive to the degree of rotation of the engine crankshaft to produce crank standard angle indicative and crank pulse signals, a temperature sensor fitted in the engine cylinder jacket to produce an engine temperature indicative analog signal proportional to the engine coolant temperature, an engine starter switch responsive to the on-off operation of the engine starter to produce an on-off signal, a transmission switch responsive to the transmission gear position to produce a gear position indicative signal, an engine speed sensor responsive to the speed of rotation of the engine to produce an engine speed indicative analog signal, and a manifold vacuum sensor responsive to the vacuum at the engine intake manifold to produce a manifold vacuum indicative analog signal.

The microcomputer 20 includes an input section 21, a microprocessor or central processing unit (CPU) 22 including first and second only memories (ROMs) 23 and 24, and an output section 25. The input section 21 converts the analog and digital input signals from the monitoring means 10 into corresponding digital signals for application to the microprocessor 22. The microprocessor 22 calculates, from the received information, a pulse width Tp for a fuel injection signal supplied to a fuel injection means (not shown). It is to be noted that the pulse width Tp represents the engine load and determines the duration of fuel injection of the fuel injection means. The first ROM 23 has a table consisting of spark advance values $T_{ad}$ the microprocessor 22 reads out in accordance with the engine speed ES and the pulse width Tp. The table stored in the second ROM 24 consists of dwell angle values $T_d$ to be read in accordance with the engine speed EG and the pulse width Tp. The read spark advance and dwell angle values $T_{ad}$ and $T_d$ are fed to the output section 25.

The output section 25 provides a command signal corresponding to the read spark advance and dwell angle values $T_{ad}$ and $T_d$ to a spark control circuit 30 which in turn energizes the ignition coil 40 so as to produce sparks at each ignition plug 50 with the spark advance and dwell angle values.

Figure 2:
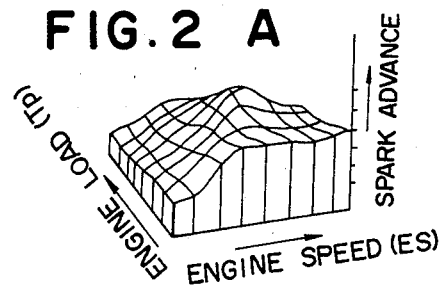
FIG. 2A is an exemplary two-dimensional table stored in the ROM of FIG. 1 with spark advance values set in function form.
FIG. 2B is an alternative two-dimensional table stored in the ROM of FIG. 1 with spark advance values set in numerical form.
Figure 2:
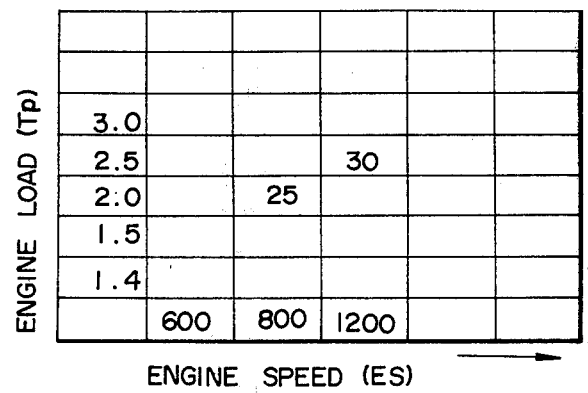

In the first ROM 23, the spark advance values $T_{ad}$ may be stored on a two-dimensional function table (as shown in FIG. 2A) or on a two-dimensional numerical table (as shown in FIG. 2B), in which the ordinates represent the engine loads represented by the pulse width Tp and the abscissae the engine speed ES. An engine load and speed specify an optimum spark advance value in the same spark advance table as long as no special vehicle running condition occurs. For engines with an exhaust gas recirculation system (EGR), however, the spark advance value should be modified in accordance with the EGR rate. For this purpose, two spark advance tables may be separately used depending on whether or not exhaust gas recirculation is performed. A plurality of two-dimensional spark advance tables may be used to accomodate changes in vehicle running conditions as described later in connection with the flowcharts of FIGS. 5 and 6. The second ROM 24 may have a two-dimensional dwell angle table constructed in the same manner as described in connection with the first ROM 23.

Figure 3:
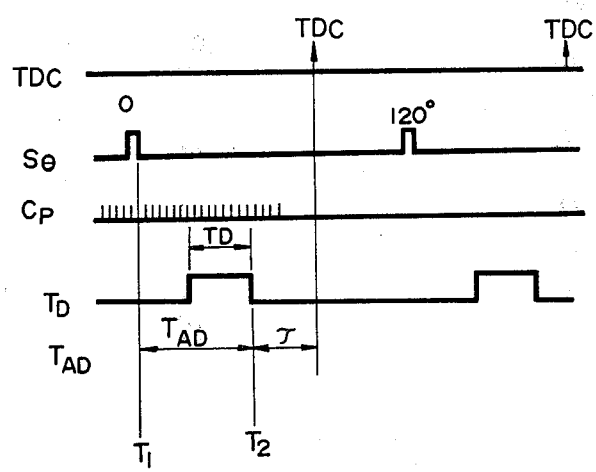
FIG. 3 is a series of waveforms for the timed relationship of the pulse signals indicative of crank standard angle, crank pulse, dwell angle, and spark advance with respect to the top dead center of each cylinder.

FIG. 3 is an illustration of the timed relationship of the pulse signals indicative of crank standard angle $S_0$, Crank pulse $C_p$, dwell angle $T_D$, and spark advance $T_{AD}$ with respect to the top dead center TDC of each cylinder. In FIG. 3, spark advance value counting operations start and stop at times $T_1$ and $T_2$, respectively. It is to be noted that the read spark advance value $T_{AD}$ is not the spark advance that actually occurs for each ignition plug. The time $T_2$ is the spark advance position with respect to the top dead center (TDC) of a cylinder the time T between time $T_2$ and the TDC is the actual spark advance.

Figure 4:
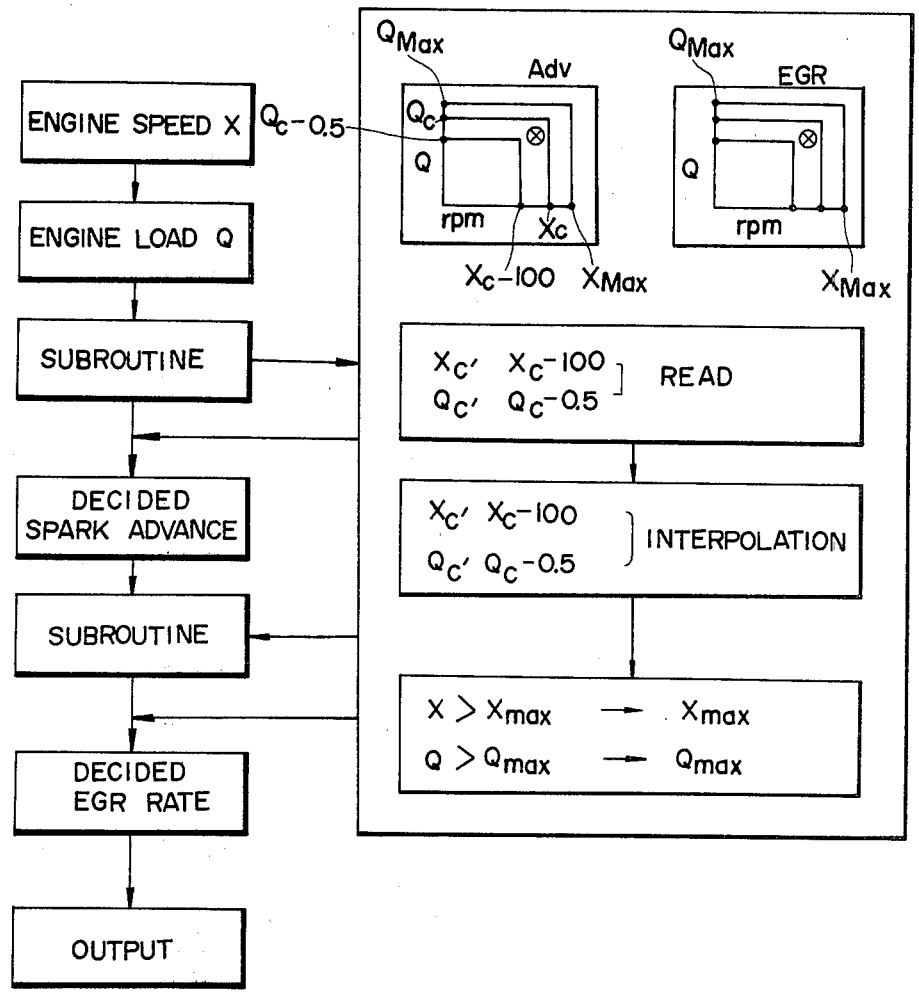
FIG. 4 is a view used to describe a subroutine for performing interpolations.

In FIG. 4 is illustrated a subroutine that is used where the two-dimensional spark advance table (the left-hand table) comprising ROM 23 has no spark advance value which can be specified by input engine load and speed values Q and X. Two engine speed values Xc and Xc-100 just above and below the determined engine speed value X and also two engine load values Qc and Qc-0.5 just above and below the determined input engine load value Q are read. Interpolation is performed for the read four values to determine the corresponding spark advance value as specified, i.e., determined by the engine speed and load values X and Q supplied to ROM 23. If the input engine speed and load values X and Q supplied to ROM 23 are above the maximum values $X_{max}$ and $Q_{max}$ set in the table, respectively, the required spark advance value is determined with an assumption that the input engine speed and load values X and Q are equal to the maximum values $X_{max}$ and $Q_{max}$, respectively.

FIG. 4 also includes an illustration of another subroutine which is used where the two-dimensional EGR table (the right-hand table) in ROM 24 has no EGR rate value which can be specified by input engine load and speed values Q and X. The required EGR rate value can be obtained in the same manner as described above in connection with the spark advance table.

Figure 5:
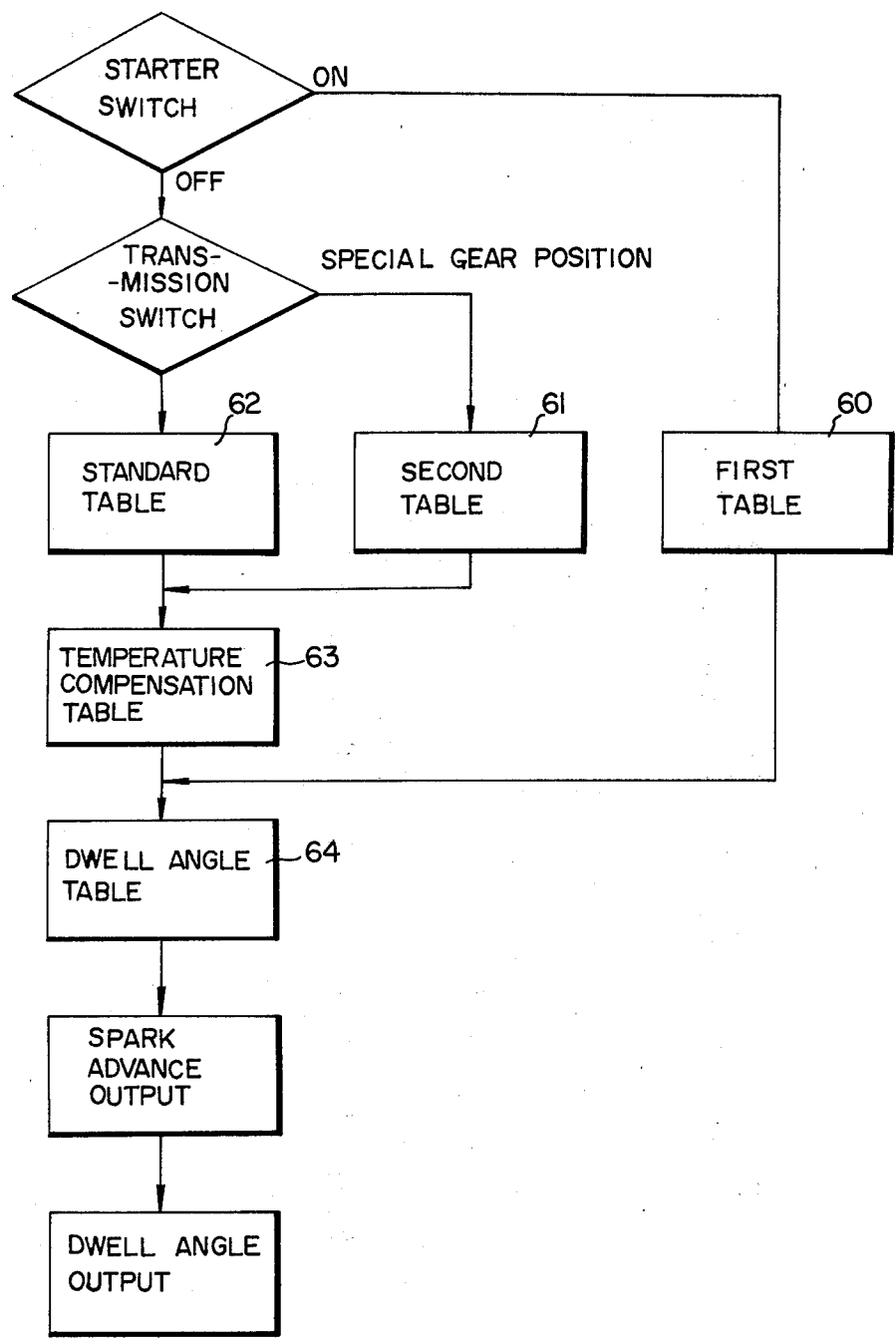
FIG. 5 is a flowchart of successive operations performed in the spark timing control system of the present invention.

FIG. 5 is a flowchart of successive operations executed by CPV 22 in the spark timing control system of the present invention for determining an optimum spark advance value.

If the engine starter switch is on, i.e., during the start up, i.e., cranking operation of the engine, the required spark advance value is determined with the use of a first spark advance table 60 and is set in an output register of output section 25. If the engine starter switch is off, i.e., during the normal mode of operation of the engine, and the power transmission is at its special gear position, e.g., at the low gear position, a second spark advance table 61 is used to determine the required spark advance value. If the transmission is not in the special position, e.g., at the high gear position, a standard spark advance table 62 is used to determine the required spark advance value. The spark advance value read from the second or standard table 61 or 62 is corrected with the use of a temperature compensation table 63 and set in the output register of section 25. The required dwell angle value is determined in response to the spark or advance value from table 60 or 63 with the use of a dwell angle table 64 and is set in the output register.

Figure 6:
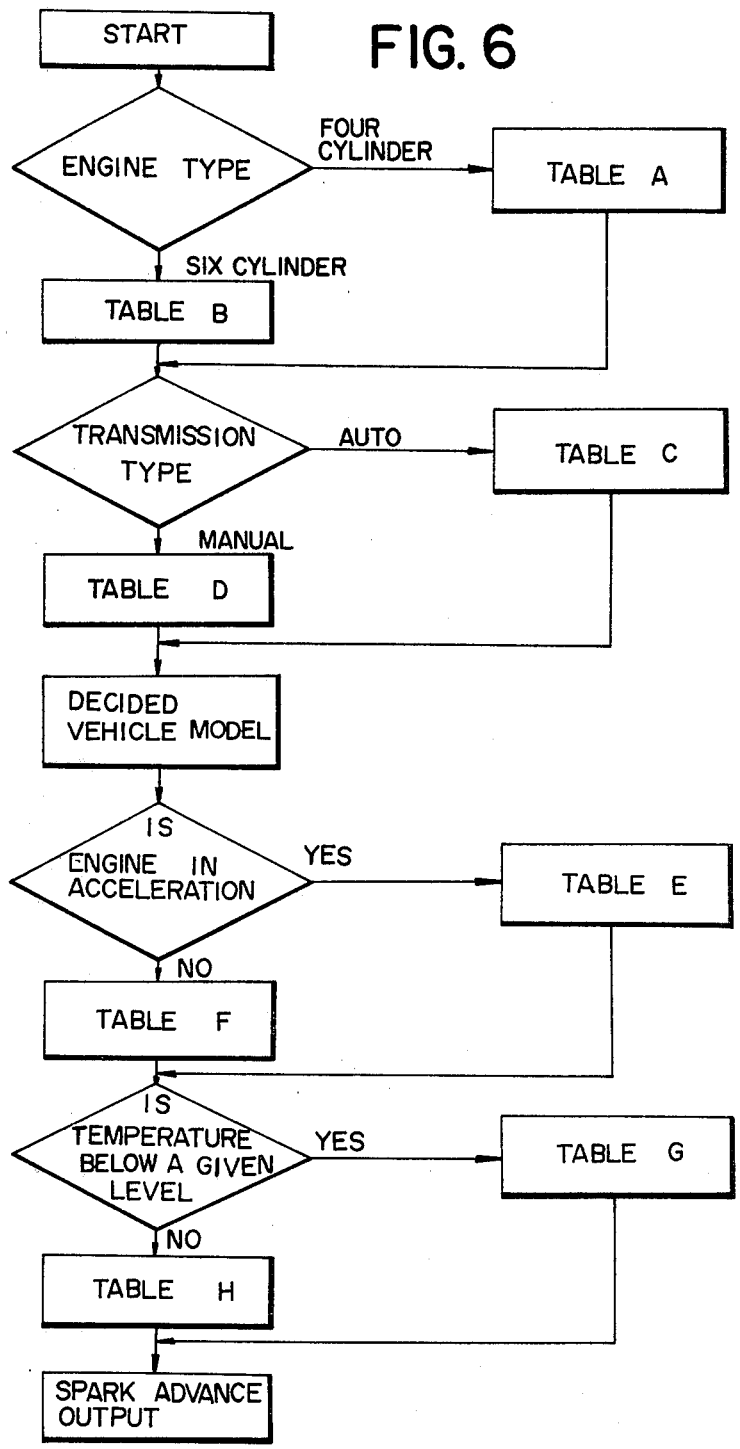
FIG. 6 is a flowchart of successive operation performed in a modified form of the spark timing control system of the present invention.

FIG. 6 is a flowchart of successive operations performed by CPV 22 in a modified form of the spark timing control system of the present invention. The flow chart of FIG. 6 is a generalized program that can be used for engines having entirely different characteristics, such that during installation certain program adjustments are made, as indicated by the decision diamond. In FIG. 6, a decision is made as is whether the engine has four or six cylinders. Table A is used for a six-cylinder engine and table B is used for a four-cylinder engine. Then, another decision is made whether the power transmission is of the automatic or manual design. Table C is used for an engine with an automatic transmission and table D is used for an engine with a manual transmission. Through the above processes, the types of the power transmission and engine are decided. Currently produced automotive vehicles are installed with an automatic or manual transmission the use of a transmission type decision switch and tables C and D permits the reduction of the kind of control devices.

Subsequently, the value of a signal from an acceleration decision switch is used to determine whether or not the vehicle is in acceleration. Table E used and F are being accelerated response to the vehicle being and is being accelerated. Then, a signal from a temperature decision switch is used to determine whether the engine coolant temperature is above or below a predetermined value. Table G is used below the predetermined temperature and table H is used above the predetermined temperature. Tables G and H may be used for correcting the read value in accordance with the temperature as described in connection with FIG. 5.

A very important advantage of the spark timing control system of the present invention is the provision of one or more ROMs, each storing a table having spark advance values set in a desired manner so that an optimum value demanded for the engine can be read as functions of engine speed and load (fuel injection signal pulse width in the case illustrated). This permits determination of an optimum spark advance value for any special vehicle running condition, such as during exhaust gas recirculation and a special transmission gear position. Determining optimum spark advance values has been impossible with centrifugal advance devices, vacuum advance devices, and conventional electronic spark timing control systems.

With the use of a spark advance table arranged for exhaust gas recirculation, it is possible to decrease the engine coolant temperature if any engine overheat condition occurs where the engine coolant temperature is about 95° C. This is accomplished by advancing spark ignition while reducing the exhaust gas recirculation rate to zero so as to cause an effective engine load drop.

With the use of a spark advance table arranged for a special transmission gear position, it is possible to obtain automatically an optimum spark advance value when the transmission is at the special gear position.

While the present invention has been described in conjunction with specific embodiments thereof, it is evident that many alternatives, modifications and variations will be apparent to those skilled in the art. Accordingly, it is intended to embrace all alternatives, modifications and variations that fall within the spirit and broad scope of the appended claims.

What is claimed is:

1. Apparatus for controlling the occurrence times of discharges of a multi-cylinder internal combustion engine of an automotive vehicle having a transmission and sources for deriving signals indicative of: (a) the engine being cranked or operating normally, (b) the transmission being in high or low gear, (c) engine speed, and (d) the values of parameters determining engine load, said apparatus comprising a computer responsive to the signals, said computer including: read only memory means having tables for storing signals with values indicative of spark advance and dwell angle as functions of engine load and engine speed for the engine being cranked, operating normally, the transmission being in high and low gear; said computer being responsive to the signals of the sources for selecting from the tables stored signals having values indicative of spark advance and dwell angle corresponding with the conditions indicated by signals (a), (b), (c) and (d); and a spark control circuit responsive to the signals having values indicative of spark advance and dwell angle for controlling the occurrence times of sparking of a spark plug for each cylinder of the engine.

2. The apparatus of claim 1 wherein the vehicle includes a source for deriving a signal indicative of engine coolant temperature, the read only memory means including a table responsive to the signal indicative of engine coolant temperature and for modifying a signal selected from a table for modifying the value of the selected signal applied to the spark control circuit.

3. The apparatus of claim 1 or 2 wherein the same type of computer is susceptible to use for vehicles having different spark advance and dwell angle characteristics as functions of engine speed and engine load, the table means including tables for a plurality of vehicle types having the different characteristics, and switch means for enabling signals of the tables associated with only one of the vehicle types to be coupled to the computer.

4. The apparatus of claim 3 wherein the tables store signals indicative only of discrete values of spark advance and dwell angle as a function of discrete values of signals indicative of motor speed and motor load, the signals having values indicative of motor speed and motor load for selecting from the table susceptible of having values between the discrete values of motor speed and motor load, the computer responding to the signals having values between the discrete values of motor speed and motor load and of spark advance and dwell angles for interpolating between the discrete values for deriving spark advance and dwell angle indicating signals having values between the discrete spark advance and dwell angle indicating signals stored in the tables.

5. The apparatus of claim 3 wherein the tables have entries indicative of maximum values of engine speed and engine load, the computer being susceptible of deriving signals having values of engine speed and engine load greater than the maximum values thereof stored in the tables, the computer responding to the signals having values in excess of the maximum values of engine speed and engine load entries in the table for reading from the tables the spark advance and dwell angle indicating signals associated with the maximum values of engine load and engine speed, respectively.

6. The apparatus of claim 3 wherein the tables store signals indicative only of discrete values of spark advance and dwell angle as a function of discrete values of signals indicative of motor speed and motor load, the signals having values indicative of motor speed and motor load for selecting from the table susceptible of having values between the discrete values of motor speed and motor load, the computer responding to the signals having values between the discrete values of motor speed and motor load and of spark advance and dwell angles for interpolating between the discrete values for deriving spark advance and dwell angle indicating signals having values between the discrete spark advance and dwell angle indicating signals stored in the tables, the tables have entries indicative of maximum values of engine speed and engine load, the computer being susceptible of deriving signals having values of engine speed and engine load greater than the maximum values thereof stored in the tables, the computer responding to the signals having values in excess of the maximum values of engine speed and engine load entries in the table for reading from the tables the spark advance and dwell angle indicating signals associated with the maximum values of engine load and engine speed, respectively.

7. The apparatus of claim 1 wherein the vehicle includes a source for deriving a signal indicative of engine coolant temperature being above or below a predetermined value, the tables of the read only memory means having separate values for temperatures above and below the predetermined value, the computer selecting the table values for temperatures above and below the predetermined value in response to the temperature source indicating the temperature being above and below the predetermined value, respectively.

8. The apparatus of claim 1 wherein the vehicle includes a source for deriving a signal indicative of the engine accelerating or decelerating, the tables of the read only memory means having separate values for the engine accelerating and decelerating, the computer selecting the table values for the engine accelerating and decelerating in response to the accelerating source indicating the engine accelerating and decelerating, respectively.

9. Apparatus for controlling the occurrence times of discharges of a multi-cylinder internal combustion engine of an automotive vehicle having a transmission and sources for deriving signals indicative of engine speed, and the values of parameters determining engine load, said apparatus comprising a computer responsive to the signals, said computer including: read only memory means having tables for storing signals with values indicative of spark advance and dwell angle as functions of engine load and engine speed; said computer being responsive to the signals for selecting from the tables signals having values indicative of spark advance and dwell angle corresponding with the conditions indicated by the values of the signals indicative of engine speed and parameters determining engine load; a spark control circuit responsive to the signals having values indicative of spark advance and dwell angle for controlling the occurrence times of sparking of a spark plug for each cylinder of the engine; the same type of computer being susceptible to use for vehicles having different spark advance and dwell angle characteristics as functions of engine speed and engine load; the table means including tables for a plurality of vehicle types having the different characteristics; and switch means for enabling signals of the tables associated with only one of the vehicle types to be coupled to the computer.

10. The apparatus of claim 9 wherein the vehicle includes a source for deriving a signal indicative of engine coolant temperature, the read only memory means including a table responsive to the signal indicative of engine coolant temperature and a signal selected from a table for modifying the value of the selected signal applied to the spark control circuit.

11. The apparatus of claim 10 or 9 wherein the tables store signals indicative only of discrete values of spark advance and dwell angle as a function of discrete values of signals indicative of motor speed and motor load, the signals having values indicative of motor speed and motor load for selecting from the table susceptible of having values between the discrete values of motor speed and motor load, the computer responding to the signals having values between the discrete values of motor speed and motor load and of spark advance and dwell angles for interpolating between the discrete values for deriving spark advance and dwell angle indicating signals having values between the discrete spark advance and dwell angle indicating signals stored in the tables.

12. The apparatus of claim 11 wherein the tables have entries indicative of maximum values of engine speed and engine load, the computer being susceptible of deriving signals having values of engine speed and engine load greater than the maximum values thereof stored in the tables, the computer responding to the signals having values in excess of the maximum values of engine speed and engine load entries in the table for reading from the tables the spark advance and dwell angle indicating signals associated with the maximum values of engine load and engine spark, respectively.

13. The apparatus of claim 10 or 9 wherein the tables store signals indicative only of discrete values of spark advance and dwell angle as a function of discrete values of signals indicative of motor speed and motor load, the signals having values indicative of motor speed and motor load for selecting from the table suceptible of having values between the discrete values of motor speed and motor load, the computer responding to the signals having values between the discrete values of motor speed and motor load and of spark advance and dwell angles for interpolating between the discrete values for deriving spark advance and dwell angle indicating signals having values between the discrete spark advance and dwell angle indicating signals stored in the tables, the tables have entries indicative of maximum values of engine speed and engine load, the computer being susceptible of deriving signals having values of engine speed and engine load greater than the maximum values thereof stored in the tables, the computer responding to the signals having values in excess of the maximum values of engine speed and engine load entries in the table for reading from the tables the spark advance and dwell angle indicating associated with the maximum values of engine load and engine speed, respectively.

14. Apparatus for controlling the occurrence times of discharges of a multi-cylinder internal combustion engine of an automotive vehicle having a transmission and sources for deriving signals indicative of engine speed, and the values of parameters determining engine load, said apparatus comprising a computer responsive to the signals, said computer including: read only memory means having tables for storing signals with values indicative of spark advance and dwell angle as functions of engine load and engine speed; said computer being responsive to the signals for selecting from the tables signals having values indicative of spark advance and dwell angle corresponding with the conditions indicated by the values of the signals indicative of engine speed and parameters determining engine load; a spark control circuit responsive to the signals having values indicative of spark advance and dwell angle for controlling the occurrence times of sparking of a spark plug for each cylinder of the engine; the vehicle including a source for deriving a signal indicative of the engine accelerating or decelerating, the tables of the read only memory means having separate values for the engine accelerating and decelerating, the computer selecting the table values for the engine accelerating and decelerating in response to the accelerating source indicating the engine accelerating and decelerating, respectively.

* * * * *